Feb. 11, 1964 S. A. HENNING ETAL 3,120,892
CONVEYOR
Filed Nov. 28, 1960

Inventors
Sverker A. Henning
Svante S. Petersson
by Sommers & Young
Attorneys

United States Patent Office 3,120,892
Patented Feb. 11, 1964

3,120,892
CONVEYOR
Sverker A. Henning, Bromma, and Svante S. Petersson, Vallingby, Sweden, assignors to Arenco Aktiebolag, Stockholm, Sweden, a Swedish joint-stock company
Filed Nov. 28, 1960, Ser. No. 72,203
Claims priority, application Sweden Dec. 4, 1959
1 Claim. (Cl. 198—179)

The invention relates to a conveyor for transporting and holding transported objects comprising an endless conveyor belt running over conveyor wheels or rollers.

Hitherto used conveyors of this type are normally provided with chain-carried gripping means and are rather complicated.

The object of the invention is to provide a conveyor including a simple and inexpensive conveyor belt which positively holds the objects to be transported and which can be easily manufactured.

According to the invention this object can be accomplished by providing a conveyor belt consisting of a flexible, elastic material and having at least two longitudinally extending flanges between which the objects are inserted and retained during the conveying.

As will be explained in the following description, the degree of inclination of the longitudinally extending flanges with respect to one another can be varied in a very simple manner and without special mechanical actuating means so that a simple and inexpensive conveyor may be manufactured which grips the objects at desired stations and delivers the object at other desired stations.

Figure 1:
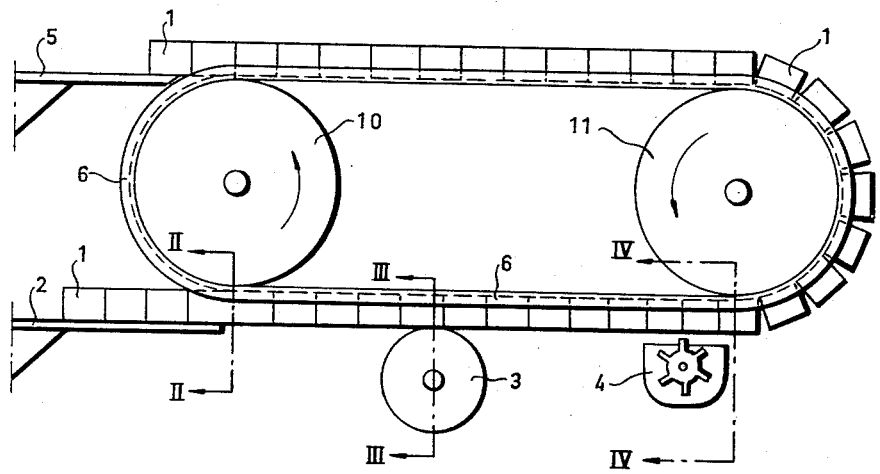
Figure 2:
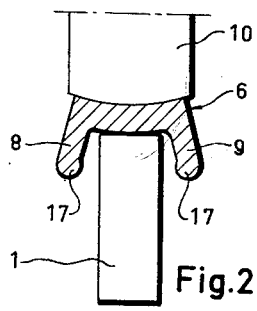
Figure 3:
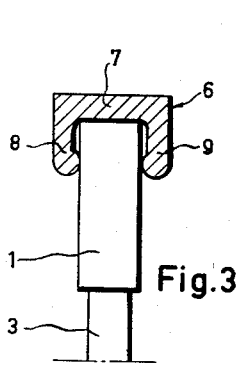
Figure 4:
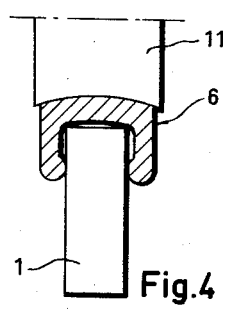
Figures 5, 6:
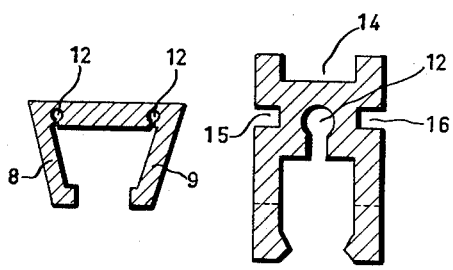

Some embodiments of the invention will now be described by way of example only, with reference to the accompanying drawing, in which:

FIGURE 1 is a side elevation of an embodiment of the invention arranged for conveying match boxes between different stations, FIGURE 2 is a section on the line II—II, FIGURE 1, FIGURE 3 is a section on the line III—III, FIGURE 1, FIGURE 4 is a section on the line IV—IV, FIGURE 1, FIGURE 5 is a section through a conveyor belt with flanges converging towards one another, and FIGURE 6 is a section through conveyor belt provided with guide grooves arranged to cooperate with means engaging the grooves and adapted to maintain the belt at a constant level.

FIGURE 1 illustrates a conveyor according to the invention and adapted for carrying match boxes from a table 2 to a glue supply roller 3, by means of which glue is supplied to one edge wall of the boxes 1, and from the glue roller 3 to a device 4 spreading sand onto the glue of said edge wall of each box and finally to a table 5 where the boxes 1 are delivered for further operations. The transport of boxes 1 is effected by an endless conveyor belt 6 of flexible material, for example rubber or a plastic material.

As shown in FIGURE 3 the conveyor belt 6 is provided with a flat bottom 7 from which bottom two flanges 8 and 9 project and between which the box 1 is held. As shown in FIGURE 1, the endless conveyor belt 6 runs over two wheels or rollers 10 and 11. The conveyor roller 10 adjacent the table 2, from which table boxes 1 are assumed to be manually fed towards the belt 6, is provided with a convex belt carrying surface, as shown in FIGURE 2, so that the two flanges 8 and 9 will be set outwardly with respect to one another, that is, separated to allow a box 1 to be pushed in between flanges 8 and 9. Said flanges 8 and 9 will however be closed immediately after leaving the roller 10, as shown in FIGURE 3, to grip and hold the inserted box 1. The conveyor belt 6 is preferably preformed or prestressed so that the flanges 8 and 9 normally converge to one another to ensure that sufficient gripping force will be obtained. Because the boxes 1 in the case illustrated should be transported to table 5 and delivered to this table with the glued and sanded side wall of the box turned upwardly the roller 11 is provided with a concave belt supporting surface, as shown in FIGURE 4, so that separation of the flanges 8 and 9, which otherwise would occur when guiding the belt over a cylindrical surface, is entirely counteracted. It is, however, possible to use a cylindrical surface on the roller 11 without the flanges being separated, so that the boxes 1 or other objects being conveyed are released from the belt 6, by initially inclining the flanges 8 and 9 as shown in FIGURE 6 whereby the flanges tend to move closer towards one another when guided over roller 11. Separation of the flanges 8 and 9 to feed the boxes 1 from table 2 to the belt is in this case carried out by a roller of a shape shown in FIGURE 2.

The belt shown in FIGURE 5 is provided with two such channels 12, which are easily obtained when the belt is manufactured through, for example, die casting.

A further modification of a conveyor belt according to the invention is shown in FIGURE 6 and provided with a groove 14 for conveyor wheels of the type shown in FIGURES 2, 3 and 4 and with two parallel guide grooves 15, 16 in which guide discs and guide bars (not shown) are intended to slide. These guide bars or guide discs are provided at such locations in the conveying path where the belt must be positioned at a predetermined level which must not be changed even if the sag of the belt should change due to a change of the length thereof. The belt of FIGURE 6 is further provided with a channel 12 for receiving a wire or the like taking up the stretching strain.

The gripping flanges 8 and 9 of the conveyor belt shown in FIGURES 2 to 4 are each provided with a rib 17 to improve the gripping capability in cases where flanges having flat inner surfaces do not ensure proper holding of the objects to be transported. If the objects are of different thickness, it has been found that the ribs 17 should be made more resilient and weaker than the flanges so as positively to prevent an object with an exceptional thickness separating the flanges 8 and 9 to such a degree that adjacent objects having normal thickness will be released.

It is obvious that the conveyor belt according to the invention may be modified in several ways within the scope of invention and that the belt enables construction of uncomplicated and inexpensive conveyor systems. The belts shown may be used in systems for sorting out, for example, faulty objects from the conveying path. An object can, thus, be removed from the lower part of the conveyor shown in FIGURE 1 by pressing a wheel, a fixed guide member or the like having a surface corresponding to that of the drive wheel 10 at a desired point of time and at a desired position against the conveyor belt 6 so that the flanges of the belt will be separated sufficiently to allow the desired object to fall from the belt.

What we claim is:

A conveyor comprising at least two spaced rotary belt supporting wheels, an endless, flat and resiliently deformable belt provided with two longitudinally extending, resiliently deformable and spaced flanges, bounding a channel for receiving objects and for resilient engagement with objects to be carried therebetween, said belt being supported by and moving around said belt supporting wheels, the belt supporting surface of one belt supporting wheel having a curvature in the axial direction of the wheel to spread the ends of the flanges remote from the wheel surface to receive and release objects and the belt supporting surface of the other wheel having a relatively less convex curvature in the axial direction of the wheel to cause the ends of the flanges remote from the wheel surface to converge and grip the objects more tightly.

References Cited in the file of this patent

UNITED STATES PATENTS

| | | |
|---|---|---|
| 763,174 | Goebel | June 21, 1904 |
| 2,410,611 | Pratt et al. | Nov. 6, 1946 |
| 2,843,370 | Engel et al. | July 15, 1958 |
| 2,928,523 | Neidhardt | Mar. 15, 1960 |
| 2,948,633 | Schriner et al. | Aug. 9, 1960 |
| 2,988,199 | Pinkham | June 13, 1961 |

FOREIGN PATENTS

| | | |
|---|---|---|
| 1,110,561 | France | Oct. 12, 1955 |